Jan. 26, 1960 L. E. JOHNSON ET AL 2,922,314
AUTOMATIC PLANETARY TRANSMISSION AND CONTROL THEREFOR
Filed March 1, 1955 3 Sheets-Sheet 2

INVENTORS
LLOYD E. JOHNSON
RAYMOND E. HOLTHE
BY
Fryer and Johnson
ATTORNEYS

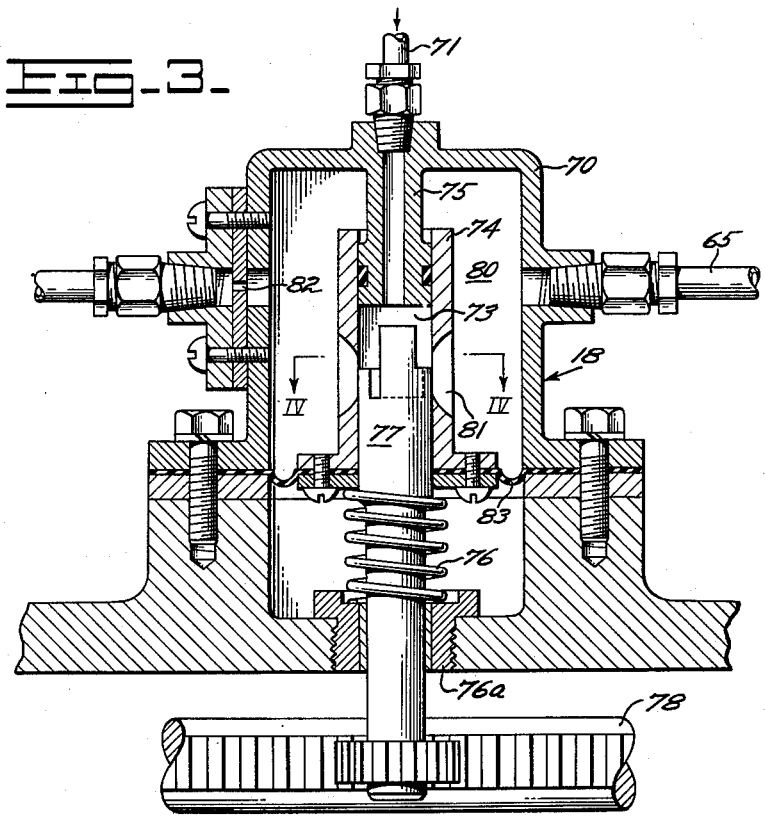
Fig-3-
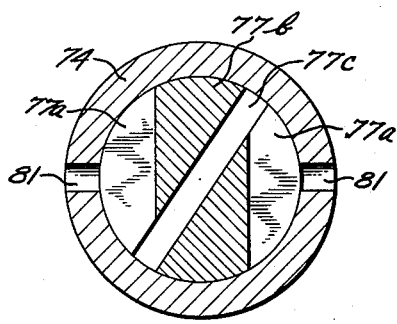
Fig-4-
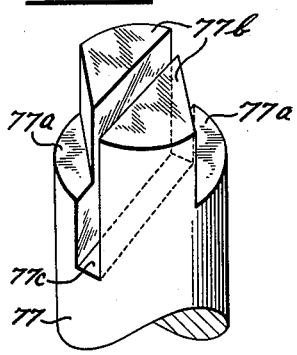
Fig-5-
INVENTORS
LLOYD E. JOHNSON
RAYMOND E. HOLTHE
BY
*Fryer and Johnson*
ATTORNEYS United States Patent Office 2,922,314
Patented Jan. 26, 1960

2,922,314

AUTOMATIC PLANETARY TRANSMISSION AND CONTROL THEREFOR

Lloyd E. Johnson and Raymond E. Holthe, East Peoria, Ill., assignors to Caterpillar Tractor Co., Peoria, Ill., a corporation of California Application March 1, 1955, Serial No. 491,332

5 Claims. (Cl. 74—472)

This invention relates to planetary transmissions and particularly to controls for automatic speech change.

In certain power applications, it is desirable to transmit torque to a shaft at a speed in relation to engine load, or the amount of fuel being delivered to the engine to drive a given load. A specific example of this type of power application is the transmission of torque to a gear-driven supercharger, which supplies air to an internal combustion engine of the compression ignition type. During idling operation of an engine or while the engine is lightly loaded, a supercharger is not necessary, since a naturally aspirated engine draws in a surplus of air in relation to the amount of fuel necessary to power the engine at a light load. As the load on the engine increases, a supercharger is beneficial to engine performance, since the amount of air drawn in by the naturally aspirated engine is limited by the volumetric efficiency of a given engine, which in turn limits the amount of fuel which can be injected into the combustion chambers of the engine. Therefore, with a supercharger supplying more air to the engine, larger amounts of fuel can be injected, which increases the maximum horsepower output of the engine. Since the horsepower output of an internal combustion engine is closely related to the amount of fuel burned during the combustion cycle, it is advantageous to increase the amount of air supplied during periods of high engine load. This may be conveniently regulated by providing an automatically controlled, variable speed transmission in the mechanical power path to a gear-driven supercharger.

Since a definite amount of power is required to drive the supercharger, it is also advantageous to disconnect the supercharger from the power train while the engine is lightly loaded, and the supercharger is not necessary. It is also advantageous to control the speed of the supercharger in direct relation to the amount of fuel injected into the engine at higher loads thereby regulating the fuel/air ratio in direct relation to engine load.

In other power applications it may be desirable to drive a shaft at lower speeds at increased engine loads; this may be easily accomplished by a specific rearrangement of the sequence of operation of this invention.

An object of this invention is to provide a mechanical power transmission and a control therefor, which will automatically shift the transmission to vary the output shaft speed in direct relation to the engine load.

Another object of this invention is to provide an internal combustion engine with a variable speed transmission to drive a supercharger, and a transmission control to automatically change the speed of the transmission to correspond to the amount of air necessary for proper combustion within the engine in relation to the horsepower output of the engine.

Another object is to provide an automatic planetary transmission, having a disc clutch and a disc brake, with a single hydraulically actuated piston, which selectively engages the clutch and the brake.

Another object is to provide an automatic transmission with a single actuating piston in an enclosing pressure chamber, which has two fluid-receiving cavities of equal volume thereby balancing the centrifugal force of the actuating fluid in these cavities.

Another object is to provide a hydraulic actuating piston of an automatic transmission with metered discharge openings while in the neutral position, thereby preventing the accumulation of sludge or other impurities in the piston.

Another object is to provide the hydraulic actuating piston of the disc clutch and the disc brake in an automatic transmission with a discharge porting arrangement so that the clutch receives oil from the discharge side of the piston while the clutch is being engaged.

In the drawings:

Fig. 3 is a cross sectional view of the detector unit of the transmission control taken on line III—III of Fig. 1;

Fig. 4 is a cross sectional view of the valve and the regulator sleeve of the detector unit taken on line IV—IV of Fig. 3; and Fig. 5 is a perspective view of the valve of the detector unit.

Figure 1:
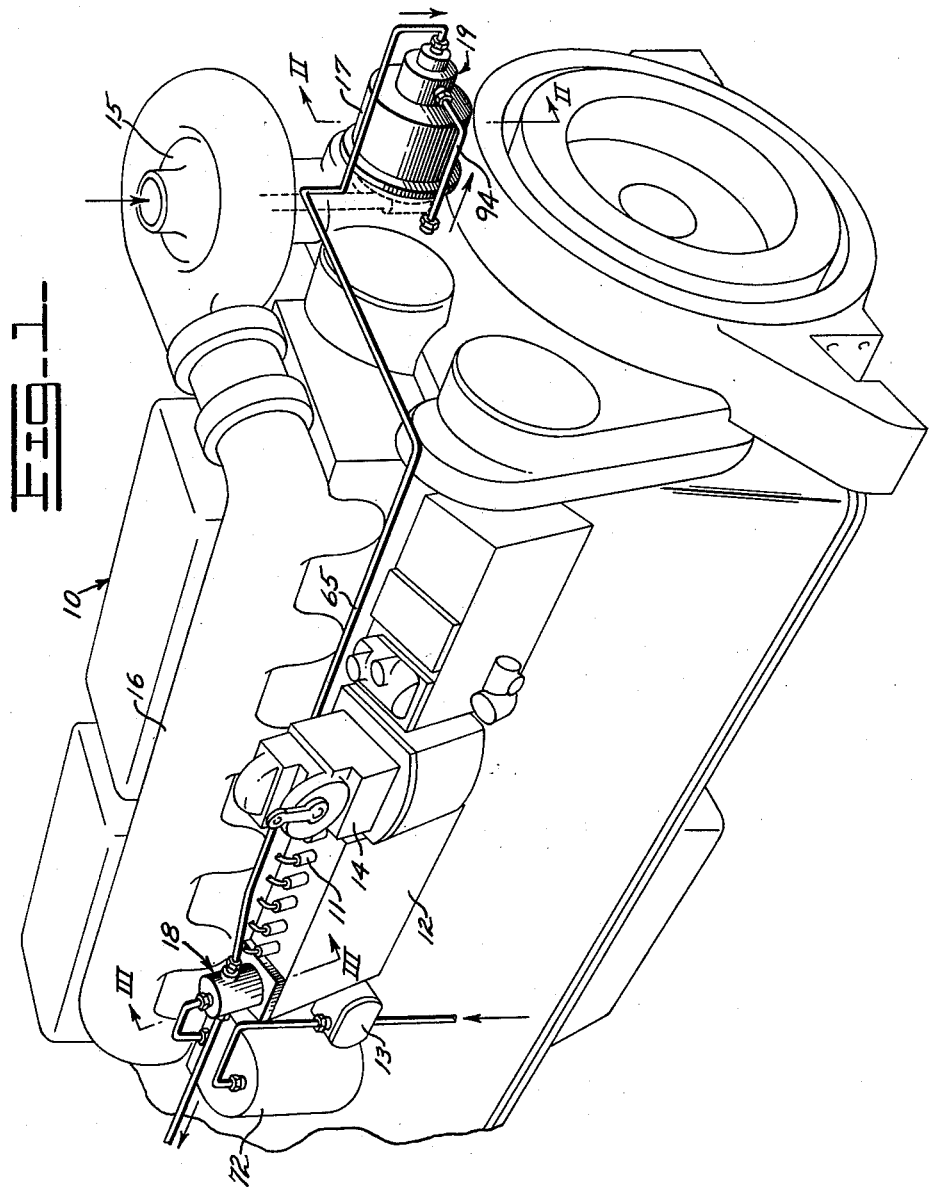
Fig. 1 is a perspective view of an internal combustion engine of the compression ignition type provided with a variable speed transmission to drive the supercharger and automatically controlled by a device associated with the fuel metering system.

In Fig. 1, a conventional internal combustion engine of the compression ignition type is shown at 10 having a plurality of fuel injection pumps 11 which are operated by a cam shaft, not shown, driven by the engine and supported in a fuel pump housing 12. Fuel is delivered to the injection pumps by means of a supply pump 13, and the amount of fuel injected into the combustion chambers is metered by the angular adjustment of the injection pumps. This angular adjustment is effected by a speed regulating governor shown at 14, which moves a rack bar meshing with gears secured to the injection pumps all being in accordance with conventional practice.

A supercharger 15 supplies air to the induction system 16 and is driven by a variable speed planetary transmission 17. The speed of the output shaft of the transmission and the supercharger to which the shaft is connected is controlled by gear ratio changes within the transmission. These gear ratios are determined by a detector unit 18 mounted on the fuel injection pump housing 12, which is regulated in direct relation to the amount of fuel being injected into the engine per cycle; and the detector unit then relays a controlling pressure to a control unit 19 mounted on the transmission 17. The manner in which this is accomplished will be explained below.

Figure 2:
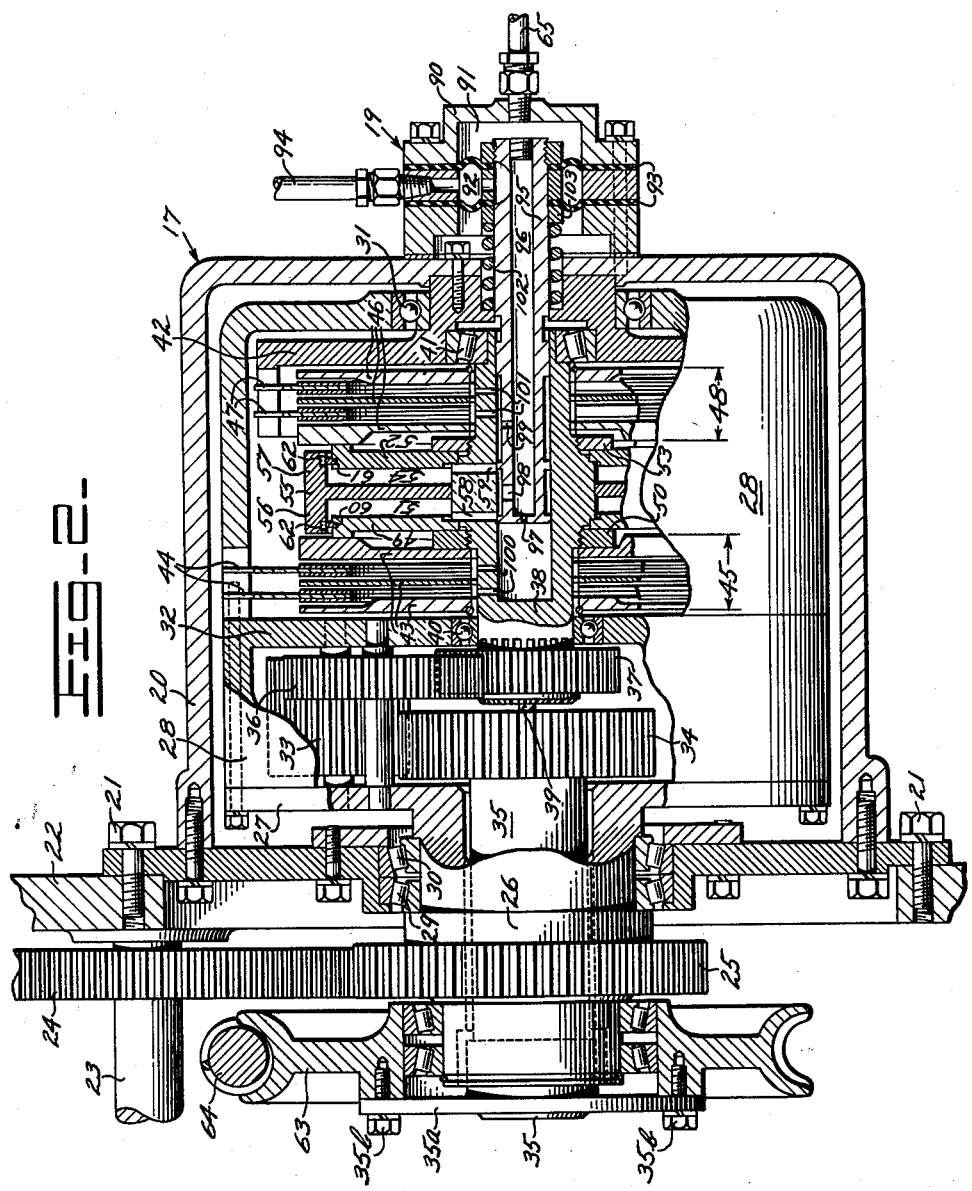
Fig. 2 is a central, horizontal sectional view of the planetary transmission and the input and output shafts taken on line II—II of Fig. 1.

In Fig. 2, the variable speed planetary transmission 17 is shown as supported and contained within a housing 20 secured by capscrews 21 to a portion of a flywheel bell housing 22 of the engine. A countershaft 23 is rotated by a gear train (not shown) connected in driving relationship with the engine crankshaft. Secured to the countershaft is a gear 24 meshing with and driving a gear 25 splined to a hollow input shaft 26 of the transmission.

The input shaft 26 is provided with a radially extending flange 27 forming an end wall of a planet carrier 28. This input shaft and carrier is then supported as a unit in the transmission housing by means of axially spaced bearings indicated at 29, 30, and 31. Rotatably mounted in the carrier 28 and supported by the flange 27 and an inner wall 32 is a long pinion 33 meshing with an output sun gear 34 integral with an output shaft 35; the long pinion 33 also meshes with a short pinion 36 rotatably mounted in the carrier 28. This short pinion is in mesh with a small sun gear 37, which is non-rotatably carried on a clutch shaft 38 concentric with the carrier 28.

The clutch shaft is loosely piloted in the output sun gear 34 by a pin 39 for assembly purposes, and is rotatably supported at one end by a bearing 40 in the inner wall 32 of the carrier and supported at the other end by a bearing 41 in an internal, radially extending flange 42 of the transmission housing. A plurality of driven clutch discs 43 are spined to the clutch shaft and cooperate with driving discs 44 to comprise a direct drive clutch 45. A plurality of brake discs 46 splined to the clutch shaft cooperate with discs 47 to comprise an overdrive brake 48.

An annular member 49 secured to the clutch shaft 38 by a ring nut 50 forms one wall of a pressure chamber 51 and also provides a stop to limit the disengaging movement of the direct drive clutch discs 43. A similar annular member 52 axially spaced from the first annular member 49 is likewise secured to the clutch shaft by a ring nut 53 to form a wall of a second pressure chamber 54 and provides a stop to limit the movement of the overdrive brake discs 46. Disposed between the walls of the pressure chambers 51 and 54 and surrounding the clutch shaft 38 in a manner to permit reciprocating axial movement is an actuating piston 55 circular in form and having axially extending flanges 56 and 57 which contact and engage the direct drive clutch 45 and the overdrive brake 48 respectively. Fluid under pressure is admitted to either or both sides of the actuating piston by means of inlet ports 58 and 59 in the clutch shaft; and, while the actuating piston 55 is in a neutral position as shown in Fig. 2, the fluid is discharged from both sides of the piston past sealing rings 60 and 61 provided at the periphery of each of the outer walls 49 and 52 of the pressure chambers and through a plurality of escape depressions indicated at 62 in both flanges 56 and 57 of the actuating piston 55. Thus, while the transmission is in the neutral position, the depressions 62 allow oil to flow past the sealing rings to prevent any accumulation of sludge in the pressure chambers 51 and 54 and also to prevent excessive pressure in these chambers which might result from centrifugal force.

When the actuating piston moves to the left as viewed in Fig. 2, the direct drive clutch 45 is engaged, thereby locking the small sun gear 37 to the planet carrier 28, which results in the output sun gear 34 and output shaft 35 turning at the same speed as the input shaft 26. A gear 63 secured to the output shaft 35 by a flange 35a and cap screws 35b drives a supercharger worm gear 64 at a speed commensurate with the efficiency of the supercharger 15 to deliver a predetermined amount of air to the engine.

When the actuating piston 55 moves to the right, the overdrive brake 48 is engaged, which locks the clutch shaft 38 and the small sun gear 37 to the non-rotatable internal radial flange 42 of the transmission housing. The short pinion 36 will then revolve around the small sun gear 37, resulting in an increase of speed of the output shaft 35 over the input shaft 26. Thus, the supercharger is turned at a higher rate of speed to deliver more air to completely burn the larger amounts of fuel delivered for a given high engine load.

The engine load detector and transmission control includes the pressure controlling detector unit shown at 18, see also Fig. 3, and is connected by a line 65 to the pressure responsive control valve unit 19 mounted on the transmission 17.

The detector unit comprises a fluid tight housing 70 receiving fuel oil under pressure through an inlet line 71 from the fuel supply pump 13 by way of a filter 72. The fuel oil enters a central chamber 73 of a regulator sleeve 74 through a nozzle 75. The regulator sleeve is adapted for reciprocation with respect to the nozzle and is biased by means of a spring 76 interposed between the regulator sleeve and the detector unit housing 70. The preload on the biasing spring may be controlled by an adjusting nut 76a. A detector valve 77 is geared to a rack bar 78 which is linked to the governor 14 and controls the angular adjustment of the fuel injection pumps 11 in response to changes in the engine load and in accordance with conventional practice. The detector valve 77 is adapted for rotation within the regulator sleeve 74 and has three distinct operating levels 77a, 77b, and 77c, which determine the neutral, direct drive, and overdrive positions respectively of the planetary transmission. These levels determine these transmission positions by controlling the fuel oil pressure within the detector unit and this controlled pressure is then transmitted by line 65 to the control valve unit 19 which in turn controls the movement of the actuating piston 55.

Fuel oil is admitted to the detector unit by way of the nozzle 75 and enters a pressure chamber 80 through two diametrically opposed slots 81 in the regulator sleeve 74. A predetermined amount will escape from the pressure chamber 80 through a bleed orifice 82 of a size selected in relation to the amount of fuel oil entering through the nozzle 75. This discharged fuel oil may be returned to the source of supply. The pressure in chamber 80 will then increase and tend to deflect a diaphragm 83 secured to the housing 70 and to the regulator sleeve 74, until the pressure has deflected the diaphragm 83 and also has moved the sleeve 74 downwardly, as viewed in Fig. 3, to a position where the particular operating level (one of 77a, 77b or 77c), which is indexed with the regulator slots, partially covers the regulator slots 81. The detector unit 18 will then reach a balanced condition where the pressure in chamber 80 balances the force of the spring 76 at that particular degree of compression and the amount of oil flowing into the chamber 80 through the slots 81 equals the amount flowing out by way of the orifice 82. Thus the pressure in the chamber 80 is determined by the angular position of the detector valve 77 and the particular level of this valve which will then index with and partially cover the regulator slots 81 at the balanced condition.

While the engine is idling or is lightly loaded, the level 77a is indexed with the regulator slots 81; and a relatively medium pressure will result in the chamber 80, since the level 77a is intermediate the extreme level 77b and 77c. This condition is shown in Fig. 3. As the load on the engine increases, the rack bar 78 will be advanced in response to the governor 14. The fuel injection pumps 11 are angularly adjusted, thereby increasing the amount of fuel, and the detector valve 77 will also be slightly rotated until level 77b is indexed with the regulator slots 81. This will result in a relatively low pressure in the chamber 80, since level 77b will close the regulator slots 81 until the spring 76 urges the diaphragm and regulator sleeve 74 upwardly, as viewed in Fig. 3, and most of the fuel oil has escaped from the bleed orifice 82 before the topmost level 77b will allow additional oil to be admitted to the chamber. The pressure within the chamber 80 will again be equal to the reduced force of the spring 76 and the amount of fuel oil entering the chamber 80 will equal the amount escaping by way of the bleed orifice 82. As the load is further increased and the rack bar 78 also advances, following the response of the governor, the detector valve 77 will be rotated further until level 77c is indexed with the regulator slots 81, which will result in a high pressure in chamber 80, since the lower level 77c will allow more oil to be admitted to the chamber 80 until the diaphragm 83 and the regulator sleeve 74 are deflected downwardly, compressing the biasing spring 76. When the detector unit reaches a balanced condition, a high pressure will be maintained in chamber 80.

The control valve unit 19 is secured to the transmission 17 and comprises a fluid tight housing 90 divided into separate chambers 91 and 92 by means of a pair of spaced diaphragms 93. The chamber indicated at 91 receives fluid under regulated pressure from the detector unit 18 by means of the line 65, and the central chamber indicated at 92 receives engine lubricating oil from the engine oil pump by means of a pipe indicated at 94. The lubricating oil then enters a control valve spool 95 and follows a central channel 96 to a plurality of discharge ports indicated at 97, 98, and 99. The ports 97 and 99 direct a slight amount of oil through ports indicated at 100 and 101 to provide lubrication for the clutches 45 and 48 respectively; the discharge port 98 directs oil to the pressure chambers 51 and 54 by means of inlet ports 58 and 59. In the neutral position disclosed in Fig. 2, lubricating oil under pressure is allowed to flow into the pressure chambers 51 and 54 past the peripheral rings 60 and 61 through the depression 62 to prevent the accumulation of any sludge in these chambers and also to prevent excessive pressure as a result of centrifugal force. A biasing spring 102 provided between the transmission housing 20 and a shoulder 103 of the control valve spool 95 resists the force of the fuel oil in chamber 91. At a medium pressure in this chamber the spring will balance the pressure, and the valve spool 95 will be in the neutral position as shown; at a low pressure in the chamber, the spring will move the valve to the right, and at a high pressure the fuel oil will deflect diaphragms 93 to compress the spring 102 and move the valve spool to the left. Since the pressure chamber 80 in the detector unit 18 is connected to the pressure chamber 91 in the control valve unit 19 by means of the line 65, the chamber 91 of the control valve unit will have an identical pressure to that of the detector unit. Thus, at a low pressure in the detector unit 80, the diaphragm 93 in the control valve unit will be deflected to the right by the force of the biasing spring 102 and the control valve spool 95 will be moved to the right, as viewed in Fig. 2. At a medium pressure, the diahpragms 93 and valve spool 95 will be in a neutral position, as shown in Fig. 2, since the spring rate is designed to equal this pressure. At a high pressure, the diaphragms and valve spool will be deflected to the left.

The term "amount of air" is used throughout the description and the claims as being weight of air. The weight of air supplied to the engine may be increased by delivering the same volume of air at an increased pressure, or by an increased volume at the same pressure.

The term "load" in relation to an engine, and as used throughout the description and claims, includes any resistance to the rotation of the engine which would cause a decrease in the rotational speed of the engine unless additional fuel is injected per engine cycle to meet this resistance or to overcome this resistance if an increase in rotational speed is desired.

As described above, the amount of fuel injected per cycle is determined by the angular adjustment of the fuel injection pumps; this method is well-known in the art of regulation of Diesel engines. The pumps are angularly adjusted by means of gear segments secured to the pump plungers and in mesh with a movable rack bar. Any one of several methods may be used to control movement of the rack bar, and consequently the amount of fuel injected per engine cycle, in relation to engine load. As examples of these methods, speed responsive governors of various types have been employed to control the rack bar and angular adjustment of fuel injection pumps of Diesel engines; also the rack bar may be controlled manually if close speed regulation is not desired.

While the engine is lightly loaded and the detector valve 77 is in the position shown in Fig. 3, the transmission control valve 95 will be in a neutral position, as shown in Fig. 2, resulting in the disengagement of both clutch 45 and the brake 48 since lube oil is admitted to both sides of piston 55. Since a surplus of air is being drawn into the engine, the supercharger is not necessary and it is advantageous to disconnect it from the power train.

As the load increases and more fuel is injected into the combustion chambers, more air is necessary; or the same volume of air must be delivered to the engine at a higher pressure to supply sufficient air in proportion to the amount of fuel being injected per cycle. Therefore, the detector unit, in response to the governor, adjusts the control valve spool 95 to the right interrupting communication between central passageway 96 and inlet port 58 while directing all of the lubricating oil passing through port 98 to the pressure chamber 54 by way of inlet port 59. Thus, the piston 55 moves to the left to engage the direct drive clutch 45 while at the same time forcing the oil in chamber 51 out through port 58 past the left end of spool 95 and thence through ports indicated at 100 to provide additional oil for the clutch 45 while it is being engaged to dissipate the heat resulting from engagement of the clutch disc.

As the load increases further, the detector unit 18 relays the high pressure as determined by valve 77 to the control unit 19 to move the control valve 95 to the left to direct all of the oil passing through port 98 to inlet port 59. The actuating piston 55 is then moved to the right to engage brake 48 and, in a similar manner as above, oil from chamber 54 is discharged through port 59 and passes through ports indicated at 101 to provide additional cooling during engagement of the brake 48.

Thus, the speed of the supercharger transmission is controlled in direct relation to the engine load interpreted in amount of fuel being injected into the engine. Although shown as driving a supercharger, the transmission and control may be used in connection with power transmission to any type of shaft or load to be driven at various speeds.

By rearrangement of the levels 77a, 77b, and 77c of the detector valve 77, any sequence of operation of a transmission can be effected. The sequence of operation described above may be reversed to result in a lower speed of the output shaft when a high load is encountered thereby making more torque available; or the number of levels on the detector valve 77 may be reduced to effect only a direct drive and an overdrive speed ratio at selected engine loads.

We claim:

1. In an internal combustion engine having fuel injection and metering means, a speed-regulating governor to adjust the fuel injection and metering means to vary the fuel injected per engine cycle in relation to engine load, and a variable speed transmission driven by the engine and provided with an input shaft and an output shaft and means to establish different speed ratios between said shafts, the combination therewith of a control valve unit to effect the establishing of the various speed ratios and an engine load detecting unit communicating with the control valve to adjust said valve and effect a speed change of the transmission in relation to engine load, said load detecting unit comprising a fluid pressure regulating valve cooperating with the fuel injection and metering means, a pressure chamber closed at one end by a diaphragm, and biasing means adjacent the diaphragm to react against fluid in the pressure chamber, said control valve unit comprising a pressure chamber closed at one end by a flexible diaphragm and communicating with the load detecting unit, biasing means adjacent the diaphragm to react against fluid within the valve unit pressure chamber and valve means connected to the said diaphragm.

2. In an internal combustion engine having a speed regulating governor, a supercharger driven by the engine through a variable speed transmission, the combination of hydraulic means for shifting the transmission, means to direct engine lubricating oil to the shifting means as an actuating fluid, and means to control the flow of said actuating fluid with engine fuel oil, the last said means being connected to the engine governor and adjusted by said governor in relation to variations in volume of fuel consumed by the engine.

3. In a variable speed transmission driven by an engine and having an input shaft and an output shaft, fluid controlled transmission means to establish different speed ratios between said shafts, a fluid pressure actuated valve to control said means, and a fuel consumption detecting unit to adjust said control valve to effect a speed change of the transmission in direct relation to fuel consumption rate per engine cycle, said detecting unit having a direct connection with a fuel control member of the engine and including means for directing fluid at different regulated pressures to said control valve.

4. In an internal combustion engine having a speed regulating governor responsive to variations in load and a variable speed transmission driven by the engine and provided with an input shaft and an output shaft, planetary gearing, clutch means and brake means to control the action of said planetary gearing and thereby establish different speed ratios between the input shaft and the output shaft, hydraulic actuating means to selectively engage said clutch means, and a valve controlling said hydraulic actuating means and said brake means, the combination therewith of a fuel consumption detecting unit, means forming a connection between the detecting unit and the engine governor and communication between said detecting unit and said valve whereby the valve is adjusted to effect a speed change of the transmission in direct relation to fuel consumption rate per engine cycle.

5. In an internal combustion engine with a supercharger driven by the engine through a variable speed transmission, the combination of hydraulic means for shifting the transmission, fluid pressure actuated means to control said hydraulic means, and means controlled in direct relation to the volume of fuel being consumed by the engine to direct fluid at different regulated pressures to said fluid pressure actuated means.

References Cited in the file of this patent

UNITED STATES PATENTS

| | | |
|---|---|---|
| 1,864,870 | Stoker | June 28, 1932 |
| 2,178,356 | Brunner | Oct. 31, 1939 |
| 2,228,006 | Glacy | Jan. 7, 1941 |
| 2,399,657 | Banker | May 7, 1946 |
| 2,406,417 | Viviano | Aug. 27, 1946 |
| 2,586,220 | Gerst | Feb. 19, 1952 |
| 2,599,632 | Hindmarch | June 10, 1952 |
| 2,600,269 | Saives | June 10, 1952 |
| 2,632,544 | Hockert | Mar. 24, 1953 |
| 2,738,683 | Fleischel | Mar. 20, 1956 |
| 2,828,907 | Oehrli | Apr. 1, 1958 |
| 2,837,932 | Roller | June 10, 1958 |